United States Patent
Belli et al.

(10) Patent No.: US 11,181,751 B2
(45) Date of Patent: Nov. 23, 2021

(54) SPECTACLES WITH BIO-SENSORS

(71) Applicant: SAFILO SOCIETÀ AZIONARIA FABBRICA ITALIANA LAVORAZIONE OCCHIALI S.P.A., Padua (IT)

(72) Inventors: Nicola Belli, Padua (IT); Giorgio Manera, Padua (IT)

(73) Assignee: SAFILO—SOCIETA AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 251 days.

(21) Appl. No.: 16/619,546

(22) PCT Filed: May 22, 2018

(86) PCT No.: PCT/EP2018/063378
§ 371 (c)(1),
(2) Date: Dec. 5, 2019

(87) PCT Pub. No.: WO2018/224300
PCT Pub. Date: Dec. 13, 2018

(65) Prior Publication Data
US 2020/0133021 A1 Apr. 30, 2020

(30) Foreign Application Priority Data
Jun. 7, 2017 (IT) .......................... 102017000062334

(51) Int. Cl.
G02C 5/14 (2006.01)
G02C 5/00 (2006.01)
G02C 11/00 (2006.01)

(52) U.S. Cl.
CPC ............. *G02C 5/143* (2013.01); *G02C 5/008* (2013.01); *G02C 11/10* (2013.01); *G02C 2200/16* (2013.01)

(58) Field of Classification Search
CPC . G02C 5/14; G02C 5/143; G02C 5/12; G02C 5/008; G02C 11/10; G02C 1/00; G02C 1/10; G02C 2200/16
(Continued)

(56) References Cited

U.S. PATENT DOCUMENTS 4,712,893 A 12/1987 Anger
4,795,247 A 1/1989 Volk et al.
(Continued)

FOREIGN PATENT DOCUMENTS

CN 205899176 U 1/2017
DE 3711248 C1 7/1988
(Continued)

*Primary Examiner* — Hung X Dang
(74) *Attorney, Agent, or Firm* — Volpe Koenig

(57) ABSTRACT

Spectacles are provided with sensors for detecting biometric data when worn and when in contact with the head of the user. The spectacles include a frame having a front mount for supporting respective lenses, a nose support device and a pair of arms articulated on the front mount on laterally opposite sides, each of the arms extending longitudinally between a first end and a second, opposite end, close to which an end portion of the arm can make contact with the head at the ear. Each arm extends from the second end to a section of the arm made of flexible material that can support an auricular sensor, and the section of the arm can move, on account of its flexibility, between an operative position and a non-operative position, in which the sensor supported by the section of the arm is removably retained on the end portion of the arm.

16 Claims, 8 Drawing Sheets

(58) Field of Classification Search
USPC .......... 351/123, 111, 121, 158, 41, 114, 116, 351/118, 119
See application file for complete search history.

(56) References Cited

U.S. PATENT DOCUMENTS

| | | |
|---|---|---|
| 2005/0248717 A1 | 11/2005 | Howell et al. |
| 2008/0143954 A1* | 6/2008 | Abreu .................... H04N 7/185 351/158 |
| 2010/0045928 A1 | 2/2010 | Levy |
| 2012/0002159 A1 | 1/2012 | Blum et al. |
| 2016/0062137 A1 | 3/2016 | Perez |

FOREIGN PATENT DOCUMENTS

| | | |
|---|---|---|
| EP | 0208273 A2 | 1/1987 |
| JP | 6122229 B1 | 4/2017 |
| WO | 9424603 A1 | 10/1994 |
| WO | 9950706 A1 | 10/1999 |
| WO | 2016153359 A2 | 9/2016 |

* cited by examiner

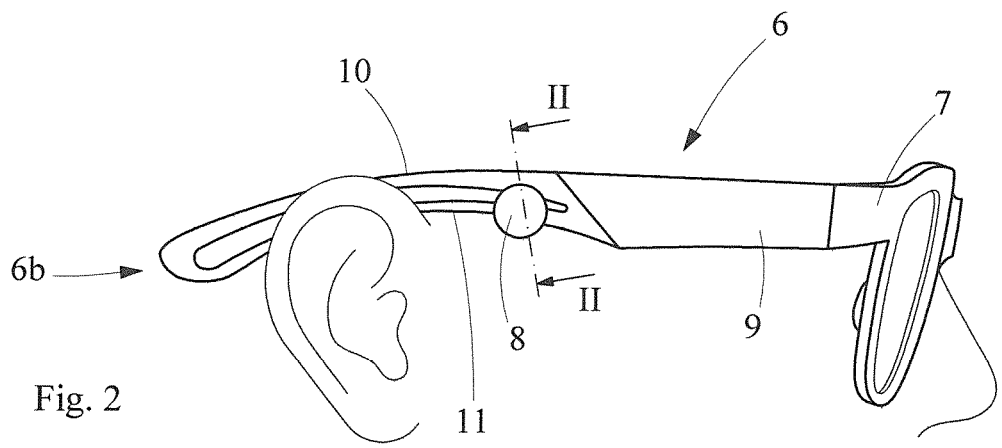
Fig. 2
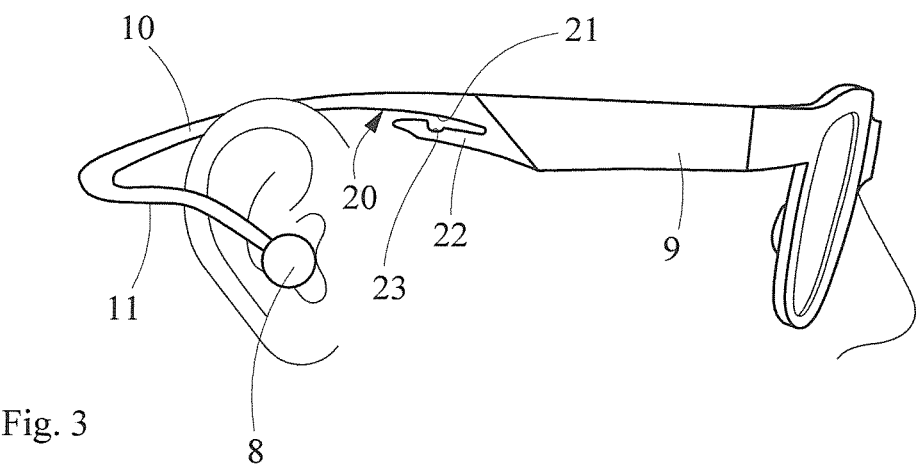
Fig. 3
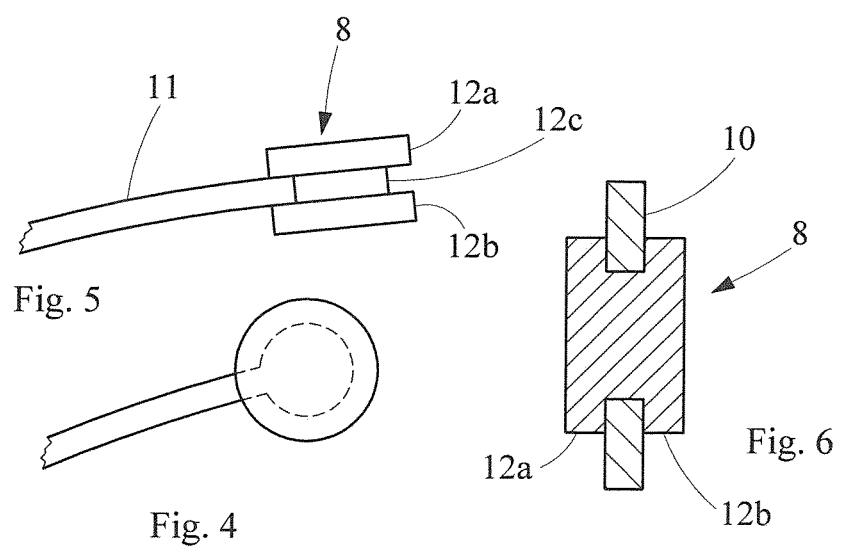
Fig. 5
Fig. 4
Fig. 6

11,181,751 B2

SPECTACLES WITH BIO-SENSORS

TECHNICAL FIELD

The present invention relates to spectacles provided with sensors for detecting biometric data when worn and when in contact with the head of the user, having the characteristics described in the preamble of the main claim 1.

TECHNOLOGICAL BACKGROUND

In more general terms, spectacles are known which incorporate in the front frame and/or on the lateral arms bio-sensors, the term "bio-sensor" meaning a sensor which can detect signals correlated to biometric values of the vital functions, for example cardiac or cerebral functions, by means of localised contact of the sensor with particular surface areas of the head.

The use of sensors of this type on the frames of spectacles is becoming widespread, in particular because of the potential advantageous applications which can be derived from the diagnosis of the vital functions. In fact, knowledge of the state of these functions, which can be detected by means of appropriate sensors integrated in the frame of the spectacles, advantageously makes it possible to intervene in the control and monitoring of the mental-physical states of a person, in order if necessary to correct or indicate situations of risk for the health and safety of this person. Reference can be made for example to monitoring of the states of stress, and more generally fatigue, which can arise when carrying out working, sports and recreational activities. Applications for sensors on spectacle frames are known wherein, when the spectacles are being worn, the sensor is placed in contact with the temple regions, or with the region behind the ear, or with the earlobe itself, or with contact surfaces of the nasal region.

Various types of sensors are also known which have an application in frames for spectacles. For example, sensors are used which operate on the basis of radiation (for example infrared radiation) transmitted or reflected, and sensors which operate as pressure sensors (for example made of piezoelectric material). These solutions are typically characterised by a certain complexity, by a large number of components, and also by a large overall size of the devices produced, with consequent discomfort when they are worn, and potential detraction from the overall appearance of the frame.

Another specific known type relates to sensors suitable for detecting electrical signals, which are produced by means of electrodes made of electrically conductive materials.

The invention comes within the particular technical scope of integration of sensors for electrical signals in spectacle frames, in particular sensors for detection of biometric data relating to cardiac functions (heartbeat and/or electrocardiogram) and/or cerebral functions (electroencephalogram) and more particularly in the specific use of sensors of an auricular type, i.e. which are designed to be able to be positioned inside the auricle (and which are also known in the sector as "in-ear" sensors).

DESCRIPTION OF THE INVENTION

In this specific concept, a main objective of the invention is to make available spectacles provided with bio-sensors of the aforementioned type, which are structurally and functionally designed to improve the technical solutions known hitherto in the prior art, and which in particular are designed to be characterised by a simple structure, with a reduced number of components, and which spectacles are easy to produce and use, as well as being very comfortable to wear, especially in the localised contact of the sensor with the ear.

Another objective is to produce spectacles with sensors of the aforementioned type which can not only detect the vital functions, but are also provided with additional devices, i.e. which are designed in combination with various auricular devices, since the latter are not produced as true sensors. Examples of such devices relate to audio earphones for listening to music or audio content in general, or auxiliary acoustic devices for correction of hearing problems (for example for people who are hard of hearing).

These objectives and others which will become apparent hereinafter are achieved by the invention by means of spectacles produced in accordance with the appended claims.

BRIEF DESCRIPTION OF THE DRAWINGS

The characteristics and advantages of the invention will become clearer from the following detailed description of some of its preferred embodiments, illustrated by way of non-limiting indication with reference to the appended drawings in which:

FIGS. 2 and 3 are views in lateral elevation of the spectacles in FIG. 1, in respective and distinct operative configurations;

FIGS. 4 and 5 are views on an enlarged scale, respectively in lateral elevation and in plan view from above, of a detail of the spectacles in the preceding figures;

FIG. 6 is a view in cross-section, and on an enlarged scale, according to the line II-II in FIG. 2;

PREFERRED EMBODIMENTS OF THE INVENTION

Figure 1:
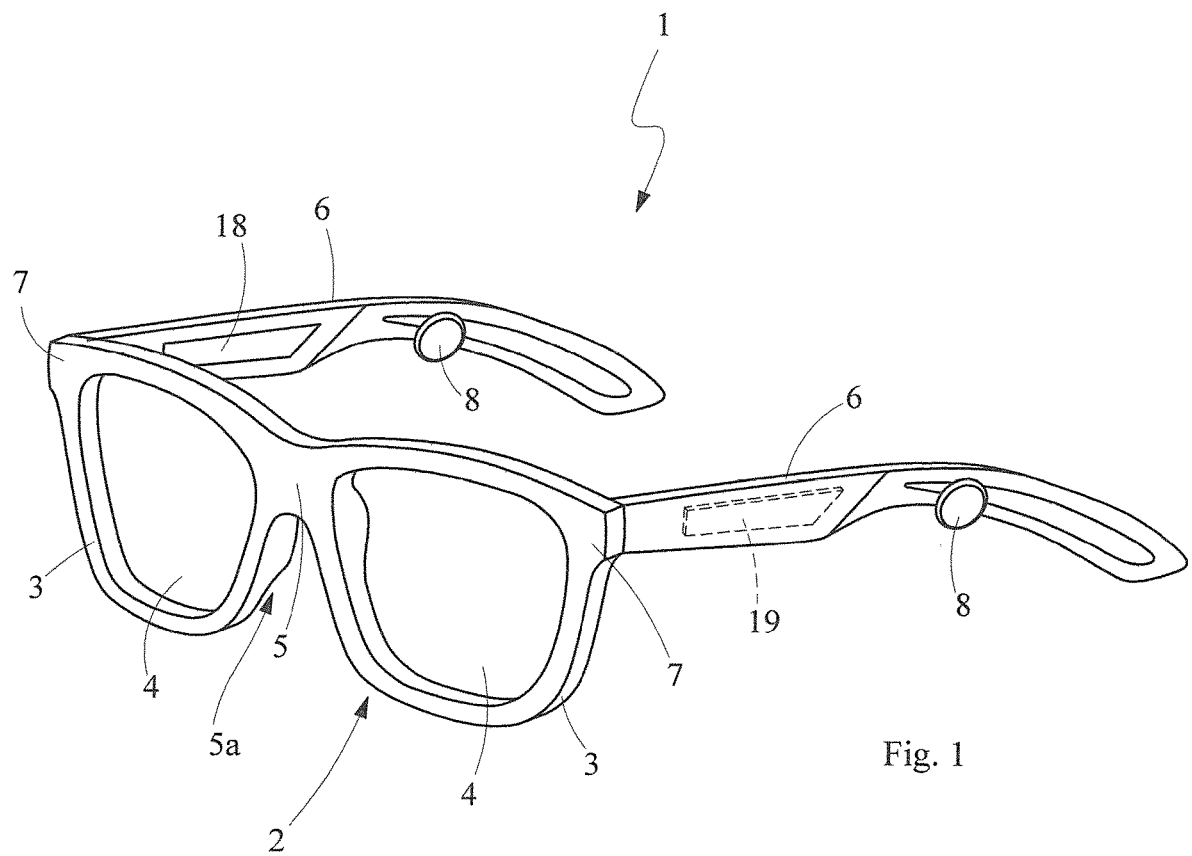
FIG. 1 is a view in perspective of a first example of spectacles according to the present invention.

With initial reference to FIGS. 1-6, 1 indicates as a whole a first example of spectacles with bio-sensors produced in accordance with the present invention. The term "bio-sensor" in this context is understood to mean a sensor for electrical signals, suitable for detecting signals correlated to biometric values of specific vital functions, a sensor of this type being designed in particular to detect the heartbeat, or an electrocardiogram (ECG), or an electroencephalogram (EEG).

The spectacles 1 comprise a frame with a front mount 2 and a pair of respective rims 3 for support of the corresponding lenses 4, the rims being connected to one another centrally by a bridge 5 which extends at the nasal region. 6 indicates both the side arms of the spectacles, which are articulated by means of hinges, with respective front pieces 7 provided on the front mount 2, on opposite lateral sides thereof. At the bridge 5 there is a nose support device 5a for frontal support of the frame on the nose.

The spectacles 1 are provided with sensors 8 of the auricular type, i.e. the sensors are designed to be positioned operatively inside the concha of the auricle, and are fitted on the lateral arms 6, as will be described in greater detail hereinafter.

The sensors 8 are functionally designed as electrodes which, when in contact with the skin, are designed to detect the electrical signal and transfer it, by means of an electrical signal conductor system suitably arranged in the frame.

In view of their structurally identical nature (although the arms are produced as specularly symmetrical structures), a single one of the side arms 6 on which the respective sensor 8 is provided will be described in detail.

The arm 6 extends in a prevalently longitudinal direction, between a first end 6a on which the corresponding front piece 7 of the mount 2 is articulated, and a second, opposite end 6b. On the arm, there is determined an arm part 9 which extends from the end 6a, and is extended in an end portion 10 of the arm reaching as far as the end 6b, close to which said portion 10 can be in contact with the area of the head behind the ear.

The arm 6, and in particular its end portion 10, in turn extends from the end 6b, in a further section 11 of the arm, which supports the sensor 8 at the free opposite end 11a of the section itself.

The section 11 of the arm is advantageously made of a flexible material, with a preselected level of resilient deformability, thanks to which the section 11 can be displaced, after it has been deformed, between an operative position in which the sensor 8 can be placed inside the concha of the auricle, for the purpose of detecting the signals in contact with the skin, and a non-operative position in which said section 11 of the arm is returned towards the end portion 10 of the arm. In this non-operative position, the section 11 of the arm is preferably maintained positioned adjacent to the end portion 10, remaining for example at a predetermined distance therefrom. The end 11a of the section 11 of the arm which supports the sensor 8 is also retained, in a removable manner, on the end portion 10 of the arm, by means of a suitable coupling system.

The sensor 8 with an auricular configuration is made of an electrically conductive material, for example of elastomer or rubber with electrical conductivity properties, in order to guarantee firstly comfort and adaptability in positioning with support contact on the skin, and secondly in order to fulfil the function of an electrode in detecting the corresponding signals. The sensor 8 is also produced with a form and dimensions suitable for guaranteeing correct and adequate positioning inside the auricle, for example close to the opening of the ear canal.

According to one embodiment, the sensor has an overall discoid shape, shown on an enlarged scale in FIGS. 4 and 5. According to this shape, the sensor is configured with two cylindrical sections 12a, 12b, with an equal diameter of the circular base, between which there is interposed an intermediate cylindrical section 12c, coaxial to the sections 12a, 12b, and having a base diameter smaller than that of said sections 12a, 12b. At the end 11a, the section 11 of the arm is connected to the section 12c of the sensor 8.

In the example represented in FIGS. 4 and 5, the two sections 12a and 12b appear to be the same as one another in terms of both form and dimensions. However, they can also differ from one another. In particular, it is possible for the section 12b which is designed to be inserted inside the concha of the auricle (facing towards, and in contact with the auricle) to have a lateral dimension, i.e. in the direction of the ear, which is larger than the lateral dimension of the opposite section 12a.

This choice can be motivated by the need to produce a sensor which has a larger extent of the surface area in contact with the skin of the concha of the auricle, in order to guarantee optimum electrical contact, and/or because of the need to produce a sensor which extends to a greater depth inside the ear canal, for example so as to obtain a sensor with improved ergonomic characteristics.

In addition, it is possible to produce a sensor with a form of the outer sections 12a, 12b which is not necessarily circular or discoid, but has a lateral profile (when seen from the ear or from the side of the head) with a form which is ovoidal, ellipsoidal, or any form which can provide a given adaptation to the form of the concha and the auricle, in order to increase comfort in application of the sensor in the ear.

Similarly, the section of the sensor 12b could have a lateral profile (when seen from the front side or from the rear side of the head) which is not rectangular, but frusto-conical, or hemispherical, with convexity facing towards the ear.

According to one embodiment, the sensor 8 is obtained integrally formed with the section 11 of the arm, for example by means of injection moulding of a conductive rubber.

According to one embodiment, the sensor 8, the section 11 of the arm, and the end portion 10 are obtained integrally formed with one another, for example by means of injection moulding of a conductive rubber.

According to one embodiment, the end portion 10 of the arm is advantageously provided with an inner cavity 13 which can accommodate a core 14, which core is produced from electrically conductive metal material, or is coated with electrically conductive metal material.

Purely by way of example, the core 14 can advantageously be produced from steel and then coated with a conductive layer of gold deposited by means of a galvanic process.

By means of the injection moulding process, the end portion 10 made of conductive elastomer material (for example conductive rubber) is over-moulded on the core 14. Since this electrically conductive elastomer material is sensitive to the electrical potential detectable on the skin by the sensor, the signal or electrical potential can be conducted and transmitted to the metal core, which in turn acts as an electrically conductive means.

The inner core 14 is extended at the area of the end portion 10 which abuts the arm part 9 in a limb 15 which is coupled in the arm part 9. By means of said limb 15, the core 14 is also connected electrically to an electronic board or module 16 (represented schematically in FIG. 7) which is received in a housing 17 provided inside the arm part 9.

According to one embodiment, the arm part 9 is produced from a plastics material of a rigid type with a lower deformation capacity than the elastomer material from which the end portion 10 is produced.

Both because of the characteristics of the preselected metal material and because of its overall geometry, the core 14 is susceptible to plastic deformation, thus making the end portion 10 of the arm "adjustable", or conformable, in order to adapt the form to the head of the user for a comfortable, stable fit of the spectacles.

In fact, if the end portion 10 of the arm is subjected to an adjustment operation, the core 14 undergoes plastic deformation, and tends to maintain the new form, whereas, since the elastomer (or rubber) which incorporates the core 14 is resiliently yielding, it tends on the other hand to be deformed resiliently, following the new bend imparted to the core, and is thus constrained to the new form adopted by the rigidity of the core.

In FIG. 2, the spectacles 1, with the sensor 8 in the non-operative position, are represented fitted on the head, with the figure schematising the nasal region and the ear region. In the fitting mode illustrated in FIG. 2, the end portion 10 of the arm and the section 11 are both positioned in the area behind the ear. As an alternative, the user can choose a second fitting mode, in which the end portion 10 of the arm is positioned in the area of the head behind the ear, whereas the section 11 of the arm is positioned in the part in front of the ear. In practice, if this mode is selected, an upper portion of the auricle thus remains interposed between the end portion 10 of the arm and the section 11 of the arm.

Figure 7:
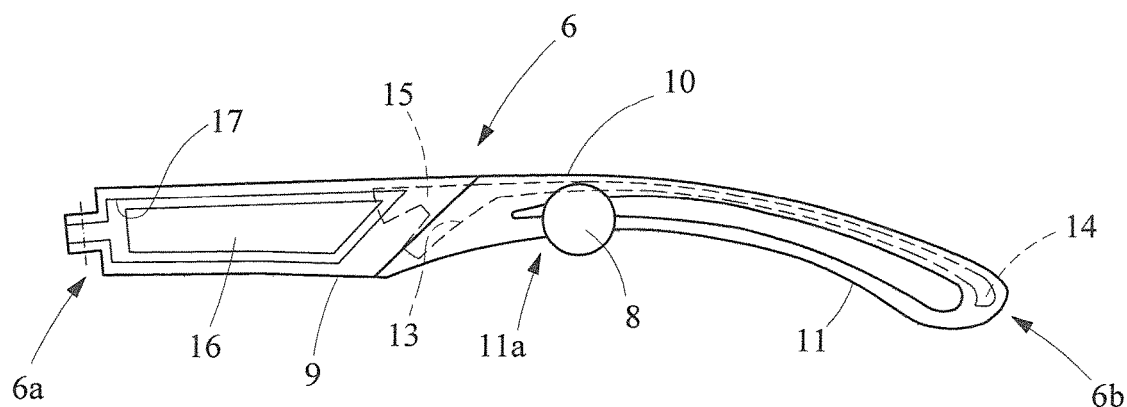
FIG. 7 is a view in lateral elevation of a side arm of the spectacles in FIG. 1.

As shown in FIG. 7, the limb 15 coupling is extended such as to project inside the housing 17, so as to permit its electrical connection to the electronic module 16.

Said housing 17, which is defined inside the space of the arm part 9, is open on the inner side of the arm (the side which faces the head of the user), and is provided with a closure cover 18 which can be coupled in a removable manner.

According to one embodiment, the housing 17 provided on one of the arms 6 is designed to receive the electronic module 16, whereas the housing produced on the other arm is designed to receive a battery 19 for the electrical supply of the electronic module and the sensors. The battery 19 is preferably of the type which is rechargeable, and is non-removable. As an alternative, it can also be of the removable type. The battery can also be of the non-rechargeable type, and in this case it must necessarily be removable, in order to be able to be replaced once it has run out of charge. In order to increase the surface electrical conductivity of the sensor 8 made of conductive elastomer, according to one embodiment there can also be the use of electrically conductive coatings, for example with electrically conductive varnishes or inks.

On the basis of specific requirements, the entire surface of the sensor can also be covered with the electrically conductive coating, or this coating can be applied only partially, covering in a targeted manner only the portions of the surface of the sensor which are in direct contact with the skin, and which in addition require greater electrical surface conductivity.

According to a further embodiment, the sensor 8, the section 11 of the arm and the end portion 10 can be obtained integrally formed by means of hot compression moulding of conductive rubber. In this case, the component constituted by said sensor 8, section 11 of the arm and end portion 10 can be produced separately, in order then to be assembled on the arm 6. Unlike the injection moulding technique, the technique of hot compression moulding of the rubber does not in fact make it possible to obtain easily the co-moulding or over-moulding of rubber components on details made of metal materials and on details made of plastics materials. An inner cavity 13 can therefore be hollowed out in the end portion 10, which cavity can receive the inner core 14. For example, the inner cavity 13 can be obtained by mechanical working after initial forming of the rubber component, obtained by means of hot compression moulding.

The end portion 10 can thus be secured on the inner core 14 (which has previously already been rendered integral with the arm 6), for example by means of a resilient coupling system, or by means of coupling with insertion by pressure, such as to permit the electrical contact between the rubber and the inner core 14. As an alternative, it is possible to secure the end portion 10 on the inner core 14 by means of use of an electrically conductive adhesive, in order to ensure transmission of the electrical signal between the rubber and the inner core.

According to a further embodiment, the sensor 8, the section 11 of the arm and the end portion 10 can be obtained integrally formed by means of moulding by pouring of electrically conductive rubber, for example conductive silicon rubber. Since also in the case of moulding by pouring of the rubber it is not easy to obtain co-moulding or over-moulding on details made of metal materials and on details made of plastics materials, it is understood here that the same considerations and the same solutions for assembly apply as those already described for the case corresponding to the use of hot compression moulding of the rubber.

With reference once more to the system for retention of the sensor 8 on the end portion 10 of the arm, when displaced in the non-operative position, for example in the embodiment in FIGS. 2 and 3, the end portion 10 of the arm comprises a seat 20 which can be engaged by the end 11*a* of the section 11 of the arm, preferably with connection or coupling of the snapping-in type. In detail, the seat 20 is defined by a recess delimited between a surface 21 of the end portion of the arm and a lip formation 22 which projects from said end portion and faces said surface 21. In the lip formation 22, an indentation 23 with appropriate curvature is provided, which can be engaged by the intermediate section 12*c* of the sensor 8.

The insertion of the end 11*a* of the section 11 of the arm in the recess 20 gives rise to slight resilient deformation of the lip 22, moving it away from the surface 21, which can generate a resilient return for the snap-in connection and retention of the sensor in the seat, when the section 12*c* of the sensor is displaced coupled with the indentation 23 of the recess. Alternatively, it can be the surface 21 which is to be deformed resiliently relative to the lip 22, in order to generate the resilient return of the snap coupling system.

Figure 8:
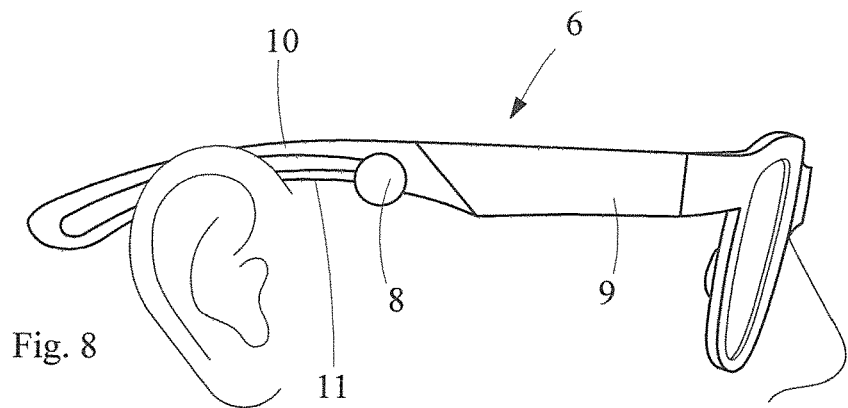
FIGS. 8 and 8A are views in lateral elevation of a further example of spectacles according to the invention, in respective and distinct operative configurations.
Figure 8A:
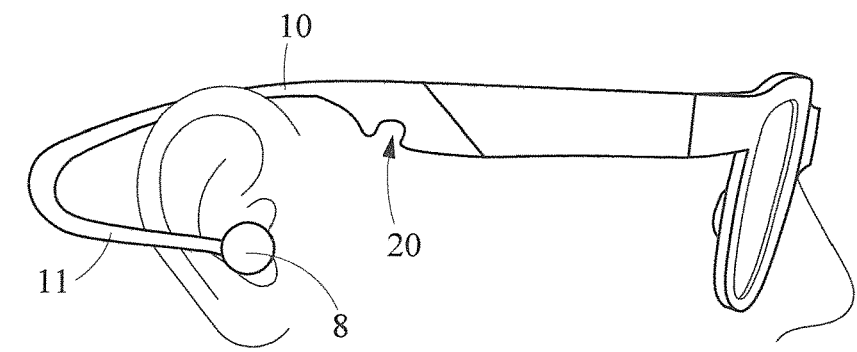

In another example shown in FIGS. 8, 8A, the seat 20 is defined by a recess with a profile substantially in the shape of a "U" provided in the end portion 10 of the arm, in a position adjacent to the area of connection of the part 9 of the arm which has the end portion 10, with the cavity of the recess extending in a direction which is inclined relative to the direction of longitudinal extension of the arm. The end 11a of the section 11, and in particular the section 12c of the sensor 8, can engage in the recess with resilient pressure coupling.

Figure 9:
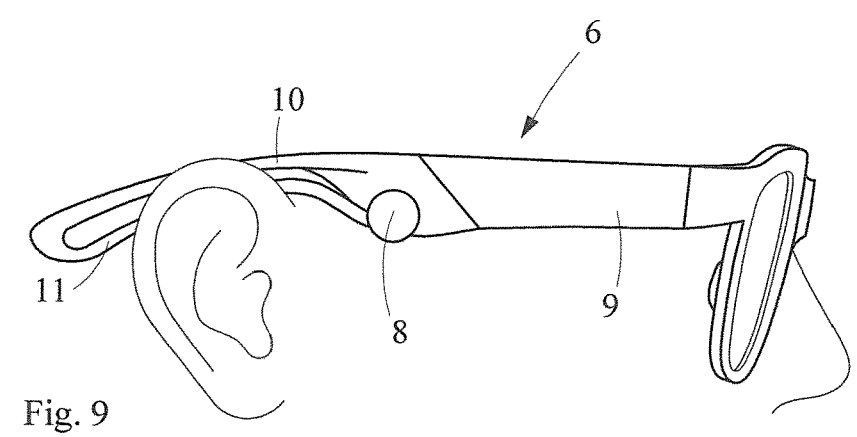
FIGS. 9 and 9A are views in lateral elevation of a further example of spectacles according to the invention, in respective and distinct operative conditions.
Figure 9A:
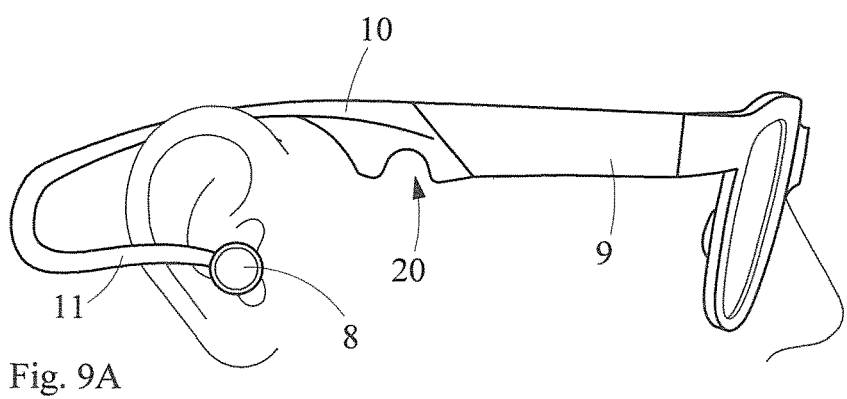

Another example is shown in FIGS. 9, 9a. In this case also, the seat 20 is defined by a recess, which can receive and retain the section 12c of the sensor 8, with coupling by interference by means of pressure. This example differs from the preceding one in the greater amplitude of the recess, which amplitude is correlated to the corresponding diameter of the section 12c of the sensor 8, which also has a larger diameter than the diameter provided in the preceding example.

Figure 10:
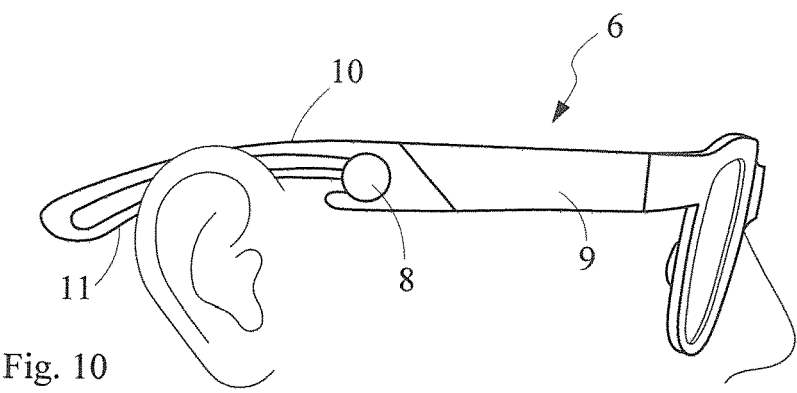
FIGS. 10 and 10A are views in lateral elevation of a further example of spectacles according to the invention, in respective and distinct operative conditions.
Figure 10A:
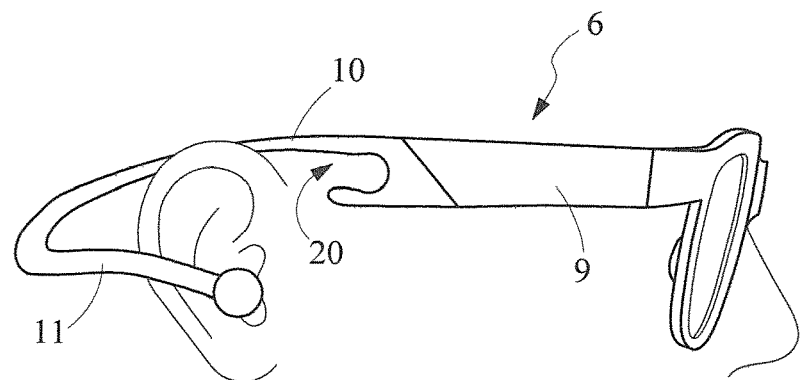

The recess extends such that the direction of insertion of the sensor in the seat is transverse to the direction of longitudinal extension of the arm. Another example is shown in FIGS. 10, 10A, in which the seat 20 defined by a recess, with a shape similar to that of the preceding example, is configured such that the direction of insertion of the sensor in the seat is oriented substantially parallel to the direction of longitudinal extension of the arm. In this example also, the coupling is obtained by insertion by means of pressure which can generate resilient interference between the coupled parts.

Figure 11:
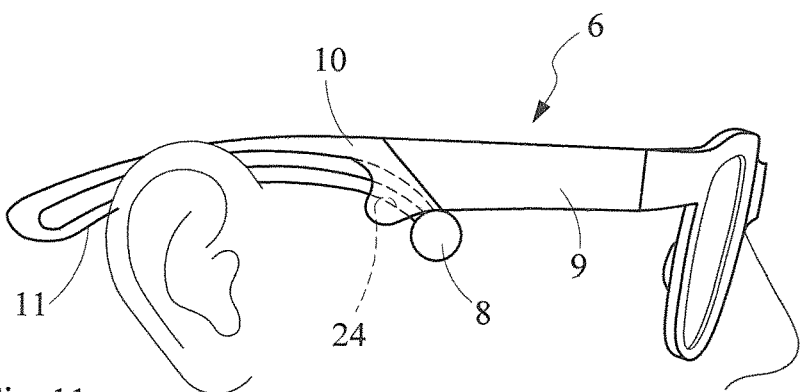
FIGS. 11 and 11A are views in lateral elevation of a further example of spectacles according to the invention, in respective and distinct operative configurations.
Figure 11A:
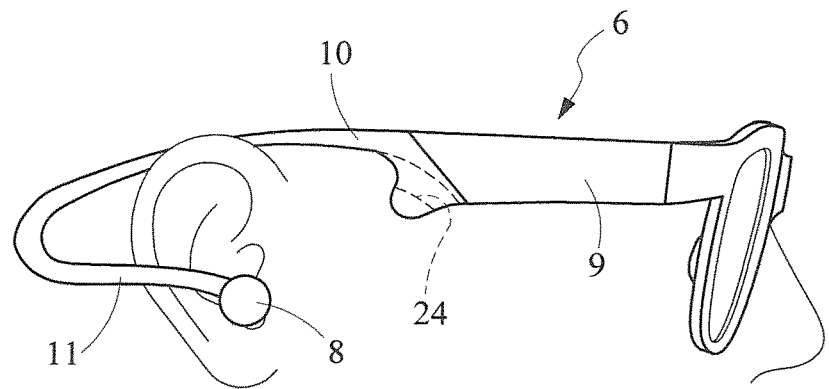
Figure 25:
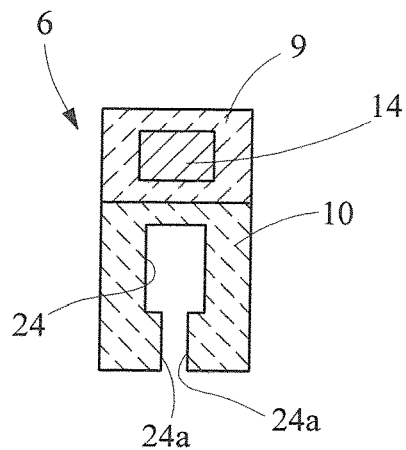
FIGS. 24 and 25 are views on an enlarged scale and in cross-section according to the line XI-XI in FIG. 11A, relating to two distinct embodiments of the detail shown.
Figure 24:
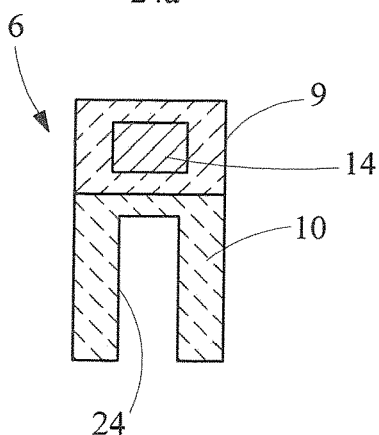

With reference to the example in FIGS. 11, 11A, at the area of connection with the part 9 of the arm, the end portion 10 of the arm is provided with a throat or groove 24, with dimensions such as to receive with reciprocal coupling an end section of the section 11 of the arm. According to one embodiment, to which the view in cross-section in FIG. 24 relates, the retention action is ensured by means of slight interference by pressure coupling (of the section 11 received between the opposite walls of the throat). According to another embodiment, to which the view in cross-section in FIG. 25 relates, the retention action is ensured by means of resilient snap-in coupling produced by one or more small teeth 24a projecting inside the throat 24 at the mouth thereof In both of the aforementioned embodiments, the part of the section 11 which is designed to engage with the throat 24 preferably extends close to the sensor 8, at the end 11a.

Figure 12:
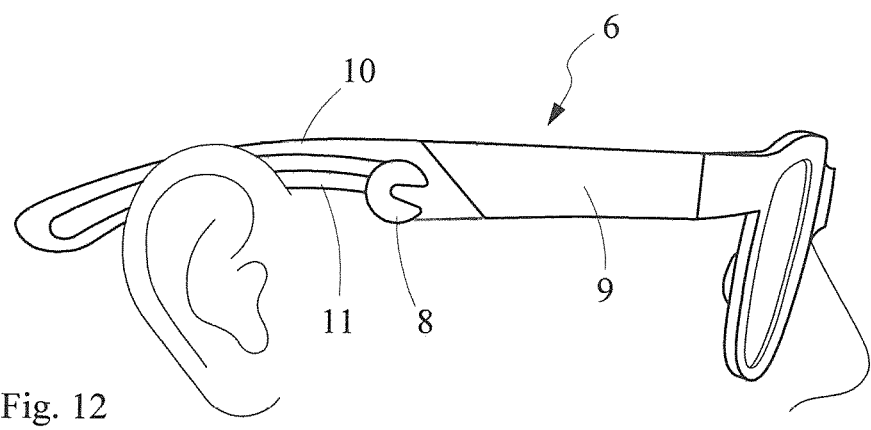
FIGS. 12 and 12A are views in lateral elevation of a further example of spectacles according to the invention, in respective and distinct operative configurations.
Figure 12A:
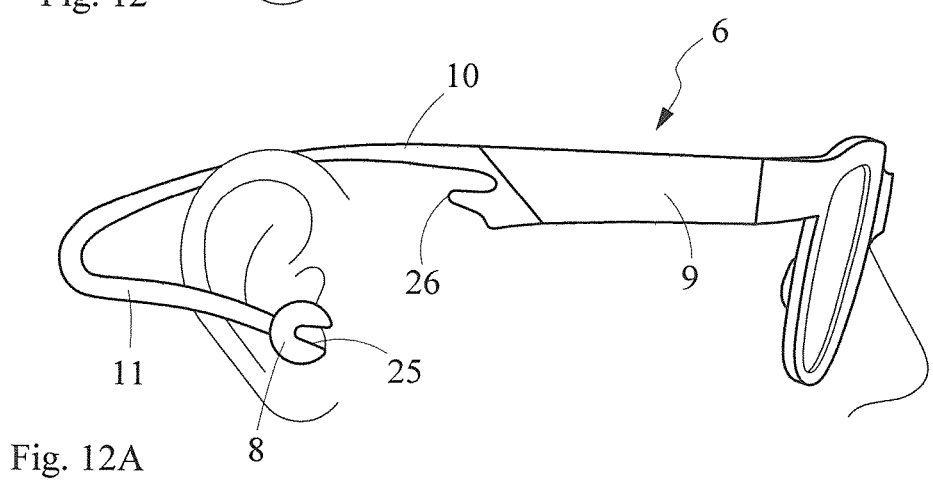
Figure 13:
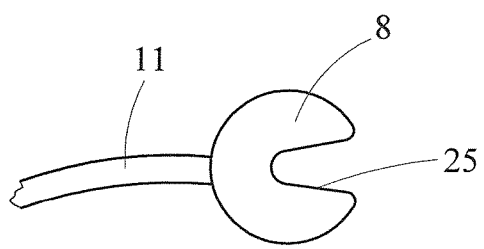
FIGS. 13 and 14 are views on an enlarged scale, respectively in lateral elevation and in plan view from above, of a detail of the example in FIG. 12.
Figure 14:
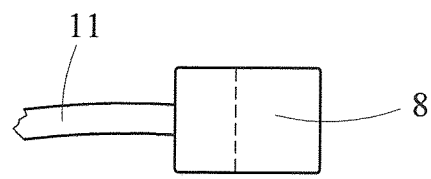

FIGS. 12 to 14 relate to a further embodiment, in which, unlike the preceding examples, the sensor 8 is provided with a recess 25 which is designed to be engaged by a limb 26 in the shape of a small tooth or small tongue, projecting from the end portion 10 of the arm. The reciprocal engagement, with substantial coupling in the form of slight pressure between the recess 25 and the limb 26, ensures the action of retention of the sensor on the arm.

Figure 15:
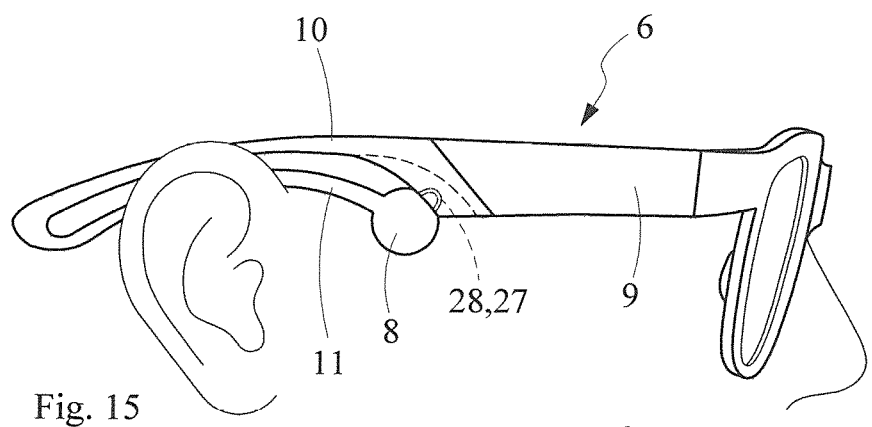
FIGS. 15 and 15A are views in lateral elevation of a further example of spectacles according to the invention, in respective and distinct operative configurations.
Figure 15A:
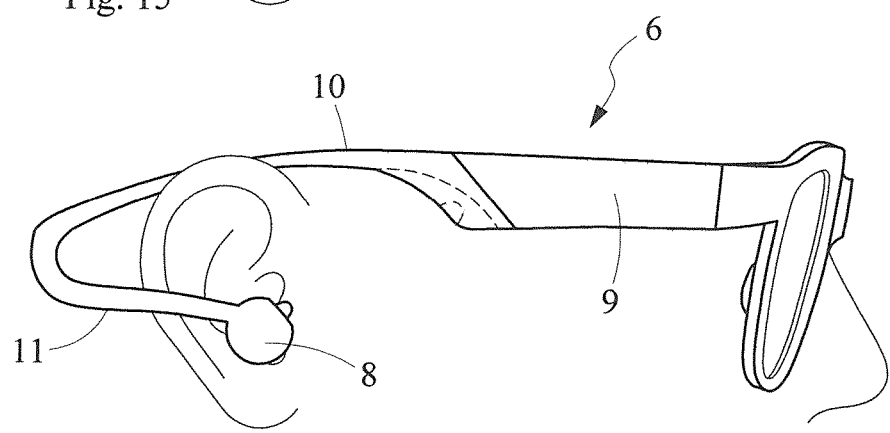
Figure 16:
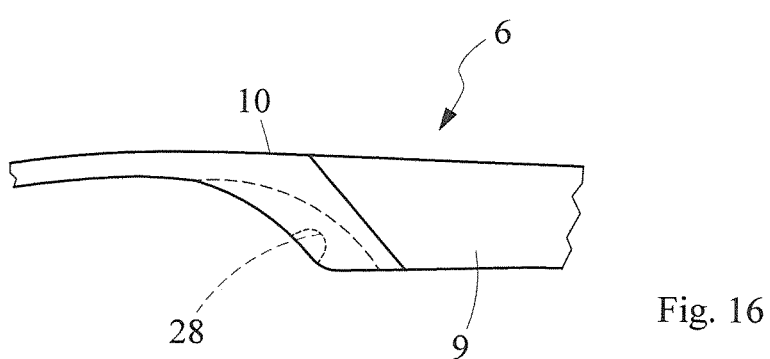
FIGS. 16 and 17 are views in lateral elevation, and on an enlarged scale, of respective details of the example in FIG. 15.
Figure 17:
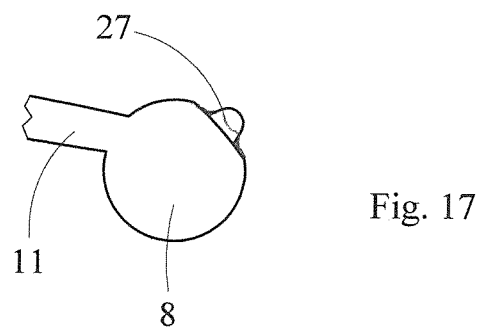
Figure 26:
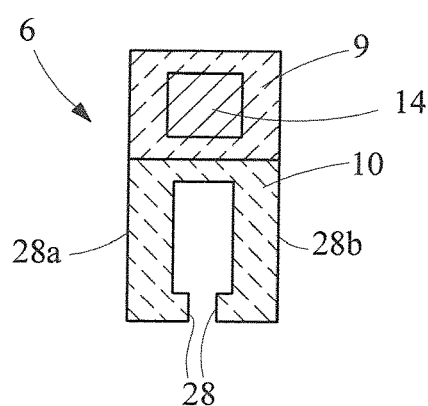
FIGS. 26 and 27 are views on an enlarged scale and in cross-section according to the line XVI-XVI in FIG. 16, relating to two distinct embodiments of the detail shown.

According to a further embodiment, shown in FIGS. 15 to 17, the sensor 8 contains a through slot 27 (integral with the sensor), which slot is designed to be engaged by coupling with a tooth formation 28 (or more than one) provided projecting in the end portion 10 of the arm. The tooth 28 is preferably provided on the inner side of the end portion, such that it is not on view. The slot 27 is advantageously provided in the outer surface profile of the sensor, in a position such as not to detract from the comfort of wearing of the sensor in the auricle. According to one embodiment, to which the view in cross-section in FIG. 26 relates, a pair of formations 28 with a tooth is provided facing one another and projecting from respective opposite flanks 28a, 28b of the end portion 10 of the arm.

Figure 27:
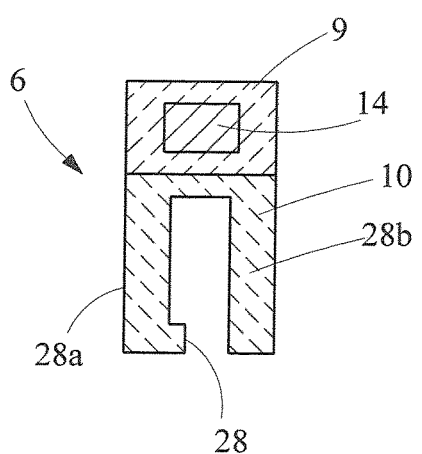

According to another embodiment, to which the view in cross-section in FIG. 27 relates, a single formation 28 with a tooth is provided projecting from one (28a) of the flanks.

According to a further embodiment, shown with reference to FIGS. 18 to 23, the sensor 8 is obtained with a shape of a ring 29 delimiting a circular aperture 30. 29a and 29b indicate respectively the surface of the cylindrical outer shell of the ring and each of the opposite lateral surfaces thereof. By means of these surfaces 29a, 29b, electrical contact takes place with the skin for the function of detection of the signal.

Inside the circular aperture 30, produced with a profile with a closed shape, an auricular device 31 which is separate and distinct from the sensor 8 can on the other hand be inserted and retained, in a removable manner. The device 31 can for example be an earphone of a conventional type for listening to music or audio content in general, or it can be an auxiliary acoustic devices for correction of hearing problems (for example for people who are hard of hearing), or, as a further alternative, it can be formed as an earplug.

Or, the device 31 can be constituted by an actual sensor of vital parameters, such as a body temperature sensor for example.

In addition, the auricular device 31 can advantageously be produced in a form suitable for being inserted and received in the opening of the ear canal, reflecting for example the shape of so-called "in-ear" auricular devices of a conventional type.

Figure 21:
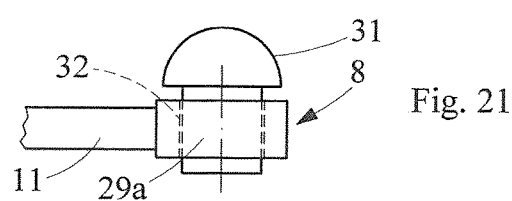
FIGS. 21, 22 and 23 are views in lateral elevation of distinct embodiments of a further detail of the example in FIG. 18.
Figure 22:
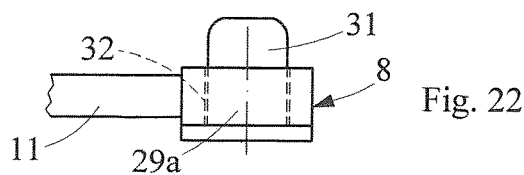
Figure 23:
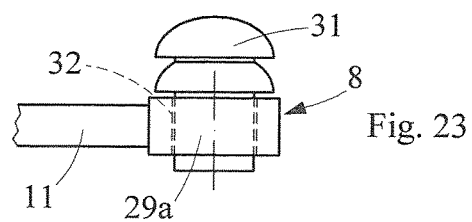

The auricular device 31 is shown in FIGS. 21-23 in respective and distinct forms, all of which having in common the fact that they include a cylindrical surface portion 32 which is designed to engage the aperture 30 for support of the device 31 on the sensor 8, for example by means of coupling with slight resilient interference.

In addition or as an alternative, the engagement and disengagement of the second device 31 in the sensor 8 can be obtained by means of coupling of the snap-in type, having provided in the profile of the opening 30 and on the diameter or outer surface of the device 31 appropriate corresponding structures such as small teeth, projections, recesses, grooves, etc.

It can be noted that the use of localised structures such a small teeth, projections, recesses, grooves, etc. can contribute not only to obtaining more stable removable securing of the device 31 in the sensor 8, but also optionally as a guide for correct positioning and centring of the device in the sensor, if this is necessary. This case could arise if the device 31 is produced such as to need to be oriented precisely inside the ear for functional or ergonomic reasons.

The connection of the auricular device 31 to the source of sound can advantageously be produced with wireless modes, for example with so-called Wi-Fi technology, wherein optionally an electrical supply battery can be incorporated in the auricular device 31.

If the auricular device 31 has the function of an aid for correction of hearing problems, as well as the electrical supply battery it can also incorporate further components typical of this type of device, such as, for example: a microphone for detection of noises and sounds in the environment; an amplifier; optionally a processor or developer of the sounds or noises; apparatuses for switching the device on/off; and apparatuses for regulation of the volume, i.e. the intensity of the sounds and noises transmitted to the ear of the user.

In order to retain the sensor 8 on the arm in the non-operative position, a coupling system is provided which is altogether similar to that shown in the example in FIGS. 10 and 10A. The seat 20 is defined by a recess which receives and retains the cylindrical surface 29a of the body with a ring 29 of the sensor (which in turn supports the auricular device 31). The retention action can be increased by slight resilient interference between the coupled surfaces, obtained by means of insertion of the sensor in the recess with slight pressure.

Figure 18:
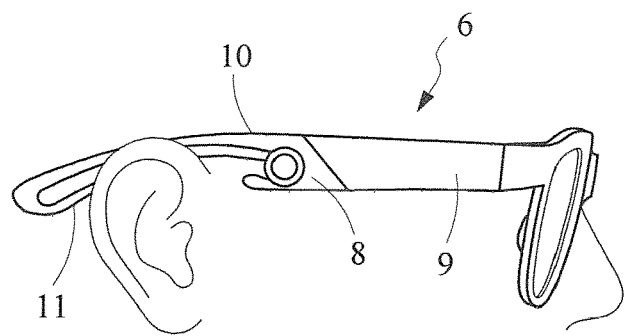
FIGS. 18 and 18A are views in lateral elevation of a further example of spectacles according to the invention, in respective and distinct operative configurations.
Figure 18A:
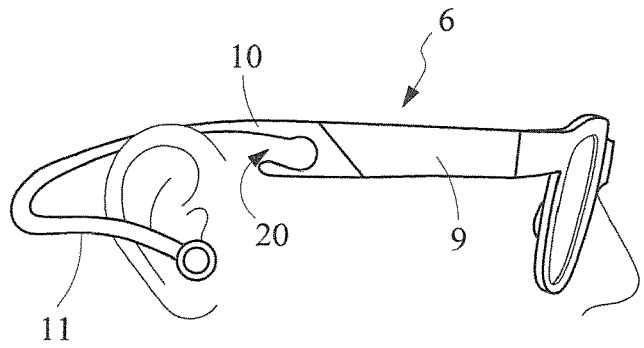
Figure 19:
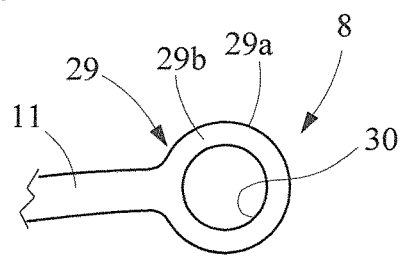
FIGS. 19 and 20 are views on an enlarged scale, respectively in lateral elevation and in plan view from above, of a detail of the example in FIG. 18.
Figure 20:
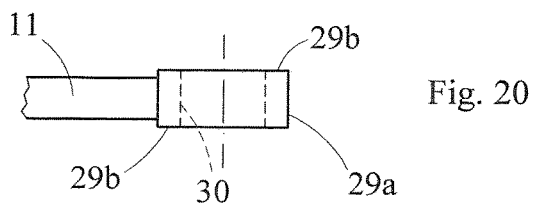

From the non-operative position in FIG. 18, the sensor can easily be released from the recess of the seat 20, such that it can easily be displaced into the operative position in FIG. 18A, thanks to the flexibility of the section 11 of the arm by means of which it is placed in the concha of the auricle, thus ensuring contact with the skin for detection of the electrical signal, and simultaneously guaranteeing correct positioning of the auricular device 31 close to the ear canal, for its respective function.

It can be seen that, according to this embodiment, the sensor 8 is thus able not only to detect the vital functions, but also to act as a support for a second auricular device, not produced as a true sensor.

The invention achieves the aims set out, and obtains the advantages described in comparison with the known solutions.

A main advantage consists of the fact that the spectacles according to the present invention provide improved comfort of fit and a better capacity for adaptation in order to reach the required positioning inside the auricle with the auricular sensor, this advantage also being obtained with a simplified structure and a reduced number of components; the spectacles are also easy to produce and use.

Another advantage is that, with the spectacles according to the invention, it is possible to go easily from an operative position of use of the sensor, to a non-operative position in which the sensor is moved away from the auricle and is retained substantially inside the profile of the overall dimensions of the arm, without detracting from the appearance of the frame.

Yet another advantage is that with the spectacles according to the invention, the functionality of the sensor is increased, by combining in the sensor itself the function of detection of the signals and the function of support for other, different auricular devices.

The invention claimed is:

1. Spectacles provided with sensors for detecting biometric data when worn and when in contact with a user's head, the spectacles comprising a frame having a front mount (2) for supporting respective lenses (4), a nose support device (5a) and a pair of arms (6) articulated on the front mount (2) on laterally opposite sides, each of said arms (6) extending longitudinally between a first end (6a) articulated on the front mount (2) and a second, opposite end (6b), close to which an end portion (10) of the arm can make contact with the head at the ear, wherein each arm (6) extends from said second end (6b) to a section (11) of the arm made of flexible material that can support an auricular sensor (8), said section (11) of the arm is displaceable between an operative position, in which the sensor (8) can be positioned in the user's auricle concha, and a non-operative position, in which the sensor supported by said section (11) of the arm is removably retained on the end portion (10) of the arm.

2. The spectacles according to claim 1, wherein at least said section (11) of the arm is made of electrically conductive rubber.

3. The spectacles according to claim 1, wherein at least said section (11) of the arm is made of a resiliently deformable material.

4. The spectacles according claim 1, wherein said section (11) of the arm has a main extension in a longitudinal direction between said second end (6b) and an opposite free end (11a) of said section (11), said sensor (8) being supported on the section (11) of the arm at said free end (11a).

5. The spectacles according claim 1, wherein said sensor (8) is integrally formed with the section (11) of the arm by means of a process of injection moulding molding of electrically conductive rubber.

6. The spectacles according claim 1, wherein said sensor (8) is integrally formed with the section (11) of the arm by means of a process of hot compression molding of electrically conductive rubber.

7. The spectacles according claim 1, wherein said sensor (8) is integrally formed with the section (11) of the arm by means of a process of molding by pouring of electrically conductive rubber.

8. The spectacles according claim 1, wherein the sensor (8) or the section (11) of the arm can engage in a respective seat (20) provided in said arm (6) so as to retain said sensor (8) or section (11) of the arm on the end portion (10) of the arm in the second, non-operative position.

9. The spectacles according to claim 8, wherein a snap-in or pressure coupling is provided between the sensor (8) and the seat (20).

10. The spectacles according to claim 1, wherein the sensor (8) is provided with a recess (25) for engaging a limb (26) provided on the end portion (10) of the arm, so as to retain the sensor (8) on said end portion (10) of the arm in the second, non-operative position.

11. The spectacles according to claim 1, wherein said sensor (8) is in the shape of a ring-shaped (29) integrally formed with the section (11) of the arm, configured to receive an auricular device (31) that is separate from, and has a separate function from, said sensor (8) removably retained in an opening (30) of the ring.

12. The spectacles according to claim 1, wherein said end portion (10) of the arm is made of electrically conductive rubber.

13. The spectacles according to, claim 12, wherein said end portion (10) of the arm is over molded on a core (14) made of conductive metal material that can remain embedded in the end portion (10) of the arm, at least in part.

14. The spectacles according to claim 13, wherein said core (14) extends into an engagement limb (15) of the end portion (10) of the arm, and can be electrically connected to an electrical circuit housed in the arm (6) in order to conduct the signals detected by the sensor (8).

15. The spectacles according to claim 13, wherein at least one of said arms (6) comprises a re-closable housing (17), which can receive an electronic module (16) that is electrically connected to said core (14) so as to conduct the signals detected by the sensor (8), said limb (15) projecting inside said housing (17) so as to electrically connect the core (14) to the electronic module (16).

16. The spectacles according to claim 15, wherein a respective housing for receipt of a battery (19) for supplying electrical power to said electronic module (16) is provided in the other one of said arms (6).

* * * * *